United States Patent
Kim et al.

(10) Patent No.: US 9,183,675 B2
(45) Date of Patent: Nov. 10, 2015

(54) APPARATUS AND METHOD FOR AUGMENTED REALITY

(75) Inventors: Jae-hyung Kim, Seoul (KR); Jong-cheol Hong, Seoul (KR); Hong-geun Kim, Goyang-si (KR); Bong-ki Kwon, Anyang-si (KR)

(73) Assignee: BIZMODELINE CO., LTD., Seoul (KR)

( * ) Notice: Subject to any disclaimer, the term of this patent is extended or adjusted under 35 U.S.C. 154(b) by 904 days.

(21) Appl. No.: 13/060,316

(22) PCT Filed: Aug. 6, 2010

(86) PCT No.: PCT/KR2010/005164
§ 371 (c)(1),
(2), (4) Date: Feb. 23, 2011

(87) PCT Pub. No.: WO2012/018149
PCT Pub. Date: Feb. 9, 2012

(65) Prior Publication Data
US 2012/0032977 A1    Feb. 9, 2012

(51) Int. Cl.
*G09G 5/00* (2006.01)
*G06T 19/00* (2011.01)

(52) U.S. Cl.
CPC .................................. *G06T 19/006* (2013.01)

(58) Field of Classification Search
CPC ..................................................... G06T 19/006
USPC ......................................................... 345/633
See application file for complete search history.

(56) References Cited

U.S. PATENT DOCUMENTS

| | | | |
|---|---|---|---|
| 2006/0038833 A1* | 2/2006 | Mallinson et al. | 345/633 |
| 2009/0109240 A1* | 4/2009 | Englert et al. | 345/633 |
| 2010/0045869 A1 | 2/2010 | Baseley et al. | |

FOREIGN PATENT DOCUMENTS

| | | |
|---|---|---|
| CN | 101101505 A | 1/2008 |
| JP | 01-300285 A | 4/1989 |
| JP | 2005250950 A * | 9/2005 |

OTHER PUBLICATIONS

PCT Application No. PCT/KR2010/005164, International Search Report, Filing Date Aug. 6, 2010, Mailing Date Nov. 23, 2010, 12 pages.
Kishino, Yasue et al., "Location Registration Method for Augmented Reality Using Computer Display and Camera", Dec. 2003, IPSJ Journal, 44(12), 3188-3196 [English language abstract included].

* cited by examiner

*Primary Examiner* — Jeffery A Brier
(74) *Attorney, Agent, or Firm* — Dorsey & Whitney LLP

(57) ABSTRACT

Disclosed is a method for augmented reality. A real world image including a marker is generated, the marker is detected from the real world image, an object image corresponding to the detected marker is combined with the real world image, and the combined image is displayed.

20 Claims, 6 Drawing Sheets

APPARATUS AND METHOD FOR AUGMENTED REALITY

CROSS-REFERENCE TO RELATED APPLICATIONS

This application is the National Stage filing under 35 U.S.C. §371 of International Application No. PCT/KR2010/005164, filed Aug. 6, 2010, the disclosure of which is incorporated herein by reference in its entirety.

SUMMARY

In one embodiment, an apparatus for augmented reality may include a processing unit coupled to picture-taking unit and a display unit. The processing unit may be configured to receive a real world image including a marker from the picture-taking unit, detect the marker from the real world image, combine an object image corresponding to the detected marker with the real world image to generate an augmented reality image, and cause the display unit to display the marker images. The marker may include at least two different marker images.

In another embodiment, a computer-readable storage device may include computer-executable instructions for detecting a marker from a real world image, searching for an object image corresponding to the detected marker, combining the object image with the real world image to generate an augmented reality image, and displaying the marker images. The marker may include at least two different marker images.

In a further embodiment, a method for augmented reality includes detecting a marker from a real world image, searching for an object image corresponding to the detected marker, combining the object image with the real world image to generate an augmented reality image, and displaying the marker images. The marker may include at least two different marker images. These and additional aspects of the current disclosure are set forth in more detail below.

TECHNICAL FIELD

This disclosure is related to an apparatus and method for an augmented reality.

DISCLOSURE OF INVENTION

An augmented reality (AR) combines a real world image with a virtual image. The real world image is an actual observable scene, one captured by a camera or another optical or electronic sensor. AR technology also uses a marker to track a real world image. The marker is typically composed of a black and white pattern and black borders surrounding the pattern. Generally, AR technology determines a virtual image corresponding to a marker and superimposes the virtual image on the marker to combine the virtual image with a real world image. According to this disclosure, an improved apparatus and method for AR are provided.

MODE OF THE INVENTION

Figure 1:
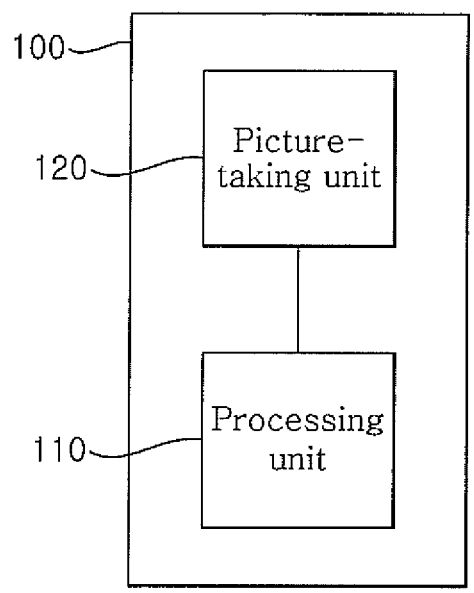
FIG. 1 is a block diagram showing an illustrative embodiment of an apparatus for augmented reality.

In one embodiment, an apparatus for augmented reality includes a picture-taking unit configured to generate a real world image including a marker; and a processing unit configured to detect the marker from the real world image, and to combine an object image corresponding to the detected marker with the real world image to generate an augmented reality image. The marker includes at least two different marker images.

In another embodiment, a processing device includes a display unit to display a marker including at least two different maker images to be provided to an augmented reality apparatus.

In further embodiment, a method for augmented reality includes detecting a marker from a real world image; searching for an object image corresponding to the detected marker; and combining the object image with the real world image to generate an augmented reality image. The marker includes at least two different marker images.

In still further embodiment, a computer-readable media having stored thereon a computer program that, when executed by at least one processor, caused the processor to perform a method for augmented reality. The method includes detecting a marker from a real world image; searching for an object image corresponding to the detected marker; and combining the object image with the real world image to generate an augmented reality image. The marker includes at least two different marker images.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Figure 2:
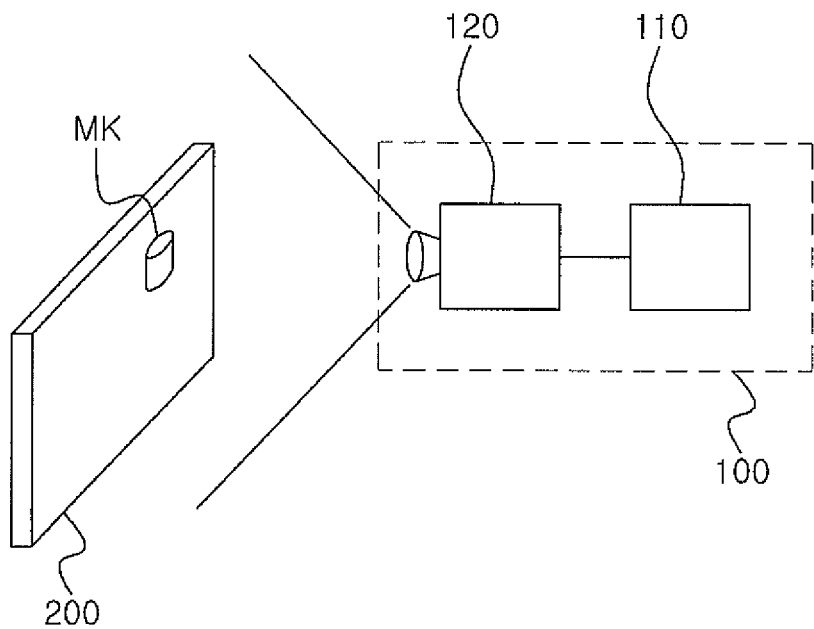
FIG. 2 is a schematic diagram showing an illustrative embodiment of augmented service provided by the augmented reality apparatus shown in FIG. 1.

FIG. 1 is a block diagram showing an illustrative embodiment of an apparatus for augmented reality. FIG. 2 is a schematic diagram showing an illustrative embodiment of augmented service provided by the augmented reality apparatus shown in FIG. 1.

FIG. 1 illustrates that an augmented reality apparatus 100 includes a processing unit 110 and a picture-taking unit 120 associated each other. In one embodiment, augmented reality apparatus 100 may be implemented as a computer or a portable information device, such as a desktop computer, a workstation, a laptop computer, a palmtop computer, an ultra mobile personal computer (UMPC), a tablet personal computer (PC), a personal digital assistant (PDA), a web pad, a mobile phone, a smart phone, an electronic diary, an MP3 player, a portable multimedia player (PMP), and so on, but not limited thereto.

Picture-taking unit 120 may be configured to capture a real world image including maker MK and transmit the real world image to processing unit 110. By way of examples, picture-taking unit 120 may include a digital camera, video camera, webcam, optical sensor, or electronic sensor, etc., without limitation. In one embodiment, marker MK may include at least two different marker images, which will be described in detail hereinafter.

Processing unit 110 may be configured to receive the real world image from picture-taking unit 120 and process the real world image. In one embodiment, processing unit 110 may detect marker MK contained in the real world image by using object recognition technology, such as edge matching, gray-scale matching, and gradient matching, without limitations, and search a storage or database (not shown) of processing unit 110 or a separate storage or database (not shown) for an object image corresponding to the detected marker MK.

In another embodiment, processing unit 110 may combine an object image (for example, a virtual graphic image) corresponding to marker MK with the real world image from the picture-taking unit 120 to generate an augmented image. Processing unit 110 may be implemented as a single chip, a plurality of chips, or on a plurality of electric components, and may have a form of a dedicated or imbedded processor, a single-purpose processor, a controller, an application-specific integrated circuit (ASIC), and so on, without limitations.

FIG. 2 illustrates that augmented reality apparatus 100 captures an image containing marker MK, which is displayed on a display device 200. By way of examples, display device 200 may include, for example, a liquid crystal display (LCD), a cathode-ray tube (CRT), an organic light emitting diode (OLED), a plasma display monitor, etc. In one embodiment, display device 200 may display marker MK. Display device 200 may be a general-purpose device, such as a computer, a portable information device, a television set, etc. as described above, but it may be designed only for displaying marker MK. Display device 200 may include a storage (not shown) to store marker information for marker MK, and the marker information may be supplied from an external server (not shown), without limitations. The marker information may include, for example, shapes, colors, or display intervals of the marker images included in marker MK, without limitations, which will be described in detail hereinafter. The marker information may be contained in, for example, a graphics interchange format (GIF) file, a flash file, or an animation file that can be outputted to display device 200, but not limited thereto. Although FIG. 2 illustrates that augmented reality apparatus 100 captures the image displayed on display device 200, it is apparent to those skilled in the art that augmented reality apparatus 100 can capture an image including a marker displayed or printed on any other thing, such as paper, plastic, wood, metal, etc., without limitations.

Figure 3:
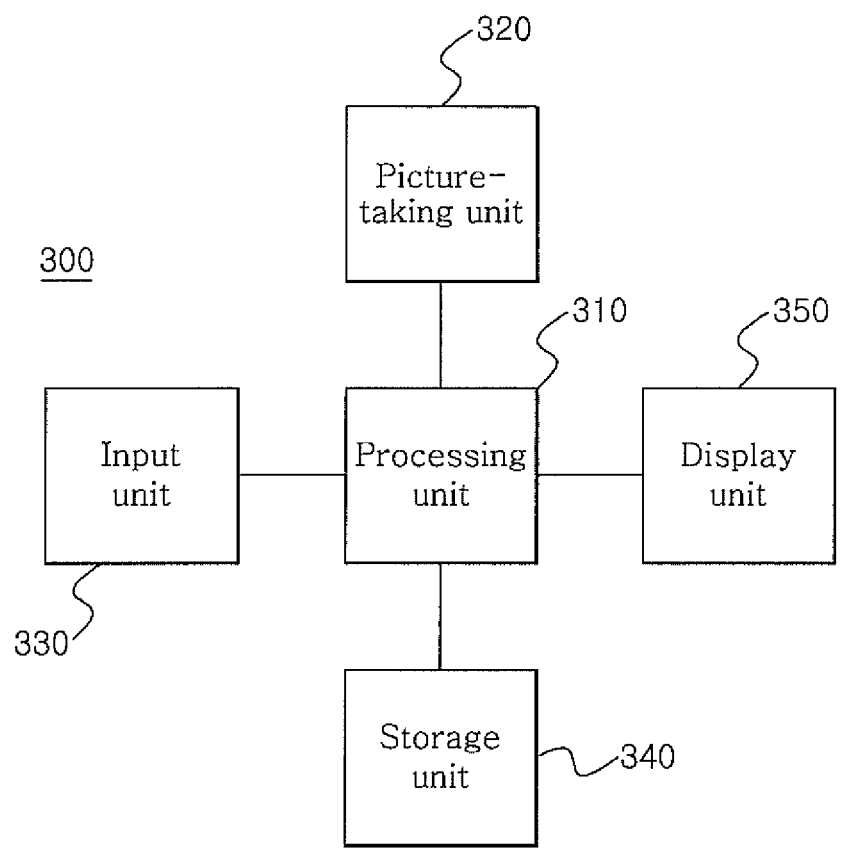
FIG. 3 is a block diagram showing another illustrative embodiment of an apparatus for augmented reality.

FIG. 3 is a block diagram showing another illustrative embodiment of an apparatus for augmented reality. FIG. 3 illustrates that an augmented reality apparatus 300 includes a processing unit 310, a picture-taking unit 320, an input unit 330, a storage unit 340, and a display unit 350.

Processing unit 310 and picture-taking unit 320 are substantially similar to processing unit 110 and picture-taking unit 120, respectively. Therefore, the detailed description about processing unit 310 and picture-taking unit 320 will be omitted.

Input unit 330 may receive input data from an external user input and transmit the input data into processing unit 310. In one embodiment, input unit 330 may include one or more of a touch sensor, a keyboard, and a mouse. For example, a user may input characters to initiate the start of applications that are to be processed by processing unit 310. For another example, a user may use input unit 330 to select options of graphical user interface (GUI) on display unit 350.

Storage unit 340 may store execution codes and marker image data and provide the codes and data to processing unit 310. For example, storage unit 340 may store marker image data and supply instructions and/or data to processing unit 310 upon the request of processing unit 310. By way of example, the marker image data may include information on various shapes or colors of a marker and/or object images corresponding to the shapes or colors of the marker, as well as algorithm or a program to be used by processing unit 310 for detecting the marker contained a real world image from picture-taking unit 320. Examples of storage unit 340 may be, without limitation, read-only memory (ROM), random access memory (RAM), hard disk drive, memory card, PC card, CD-ROM, floppy disk, or magnetic tape.

Display unit 350 may display a variety of information, for example, augmented reality image generated by processing unit 310, on a screen or a monitor. Display unit 350 may include, for example, a liquid crystal display (LCD), a cathode-ray tube (CRT), an organic light emitting diode (OLED), a plasma display monitor, etc., but not limited thereto.

Figure 4:
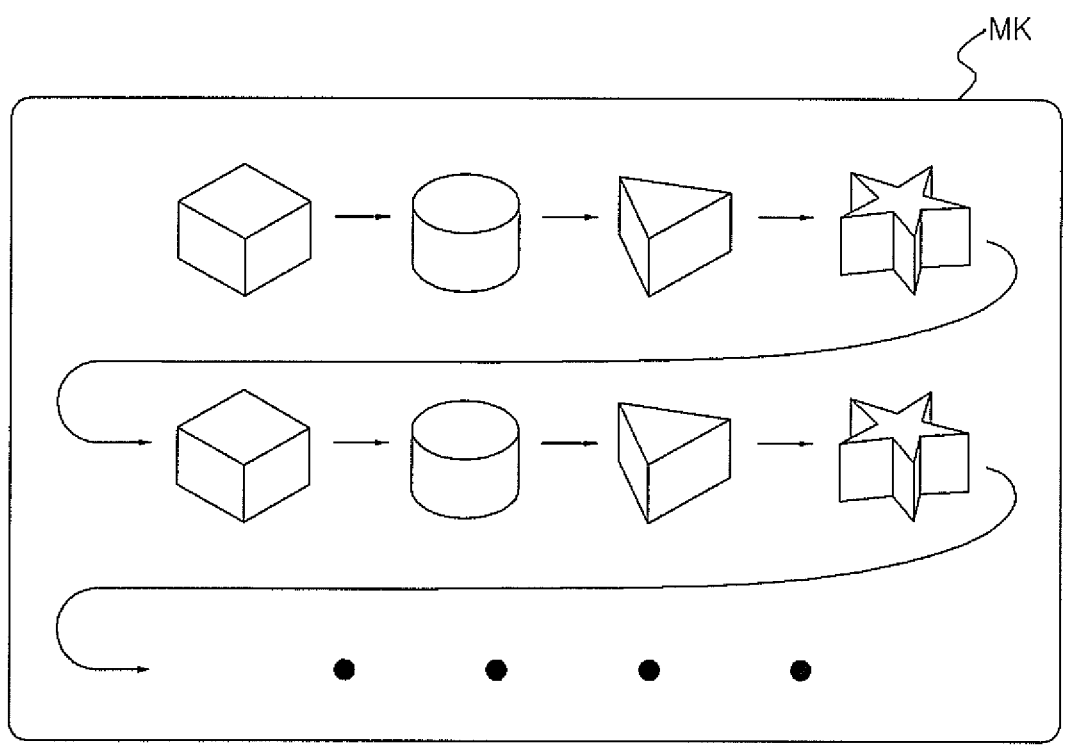
FIG. 4 is a schematic diagram showing an illustrative example of a marker.

FIG. 4 is a schematic diagram showing an illustrative example of a marker. The illustrative example can be performed by augmented reality apparatus 100 or 300.

In one embodiment, marker MK may include at least two images different from one another. For descriptive convenience, each image contained in marker MK is referred to as a marker image hereinafter. In some embodiments, the marker image may be a two or three dimensional figure. Examples of two-dimensional figures are a triangle, a tetragon, a hexagon, a circle, or a star, and examples of three-dimensional figure are a hexahedron, a circular cylinder, a trigonal prism, a tetrahedron, an octahedron, or a sphere. However, the figure is not limited thereto and may have a shape of various things, such as a character, a number, a flower, a building structure, etc. The marker image may not have a patterned shape, and the figures for the marker image may have any shapes that can be distinguishable from one another. Furthermore, the marker image is not limited to a graphic image, but it may be a real world image. In some embodiments, the marker image may have different colors other than different shapes.

In one embodiment, a set of marker images included in one marker MK may be repeatedly displayed on a displaying device (e.g., display device 200) in sequence and at a predetermined time interval. The displayed marker images may be located at a predetermined position of marker MK. The time intervals between two displayed marker images may be determined depending on the number of frames per second (fps) of a real world image captured by picture-taking unit 120 and 320. That is, the display interval of the marker images may be substantially equal to the number of fps of picture-taking unit 120 and 320 divided by a predetermined natural number. For instance, the displaying device may display the marker images in a period of 30 Hz, 15 Hz, 10 Hz, etc. for 30 fps of picture-taking unit 120 and 320. Human eyes may not recognize the marker images displayed in such a period on the displaying device.

FIG. 4 illustrates, for example, a four-digit marker MK represented by a set of four marker images, i.e., a cube, a circular cylinder, a trigonal cylinder, and a star-sectional cylinder. FIG. 4 illustrates that marker MK includes four marker images, i.e., a cube, a circular cylinder, a trigonal cylinder, and a star-sectional cylinder in sequence, and that the four marker images are repeatedly displayed in sequence. Particularly, after a first series of the four marker images, i.e., a cube, a circular cylinder, a trigonal cylinder, and a star-sectional cylinder has been displayed on the displaying device, a second series of the four marker images may be displayed on the displaying device within a predetermined time interval.

In one embodiment, each marker image may have a predetermined meaning, and, thus, marker MK may illustrate various meaning by combining the predetermined meanings respectively assigned to the marker images. For example, ten (10) marker images may represent zero (0) to nine (9), respectively. In this case, marker MK having the ten marker images may be a sequence of numbers and imply an object image like a bar code that denotes a product serial number. In another example, twenty eight (28) marker images may correspond to English characters from a to z, slash, and a dot, respectively. Accordingly, marker MK having the twenty eight marker images may represent a uniform resource locator (URL) that contains an object image. The above-described meanings for the marker images, such as numbers or English characters, are only examples, and not limited thereto. The meanings for the marker images may be defined in various ways.

In still another embodiment, marker MK may further include at least one of a beginning image representing the beginning of the marker images, an ending image representing the end of the marker images, and a checking image for detecting errors of the marker images, in addition to the marker images representing an object image. Marker MK may include boundaries surrounding marker images for easy detection, but not limited thereto.

The number of markers that can be generated with various marker images can be calculated by the multiplication of the number of the marker images and the number of the repeating of the marker images. For example, assume that marker MK includes four marker images and the set of the marker images is repeated five times, the number of marker MK generated is 256. Therefore, the number of possible four-digit markers MK made of four different marker images is $4^4=256$. Likewise, the number of possible five-digit markers MK made of four different marker images is $4^5=1,024$.

The marker image may be two-dimensional figure, three-dimensional figure, etc., and, thus, it is easy to detect the marker image. Further, it is easy to increase the number and/or digit of the marker images, and, thus, number of markers MK can be generated.

Figure 5:
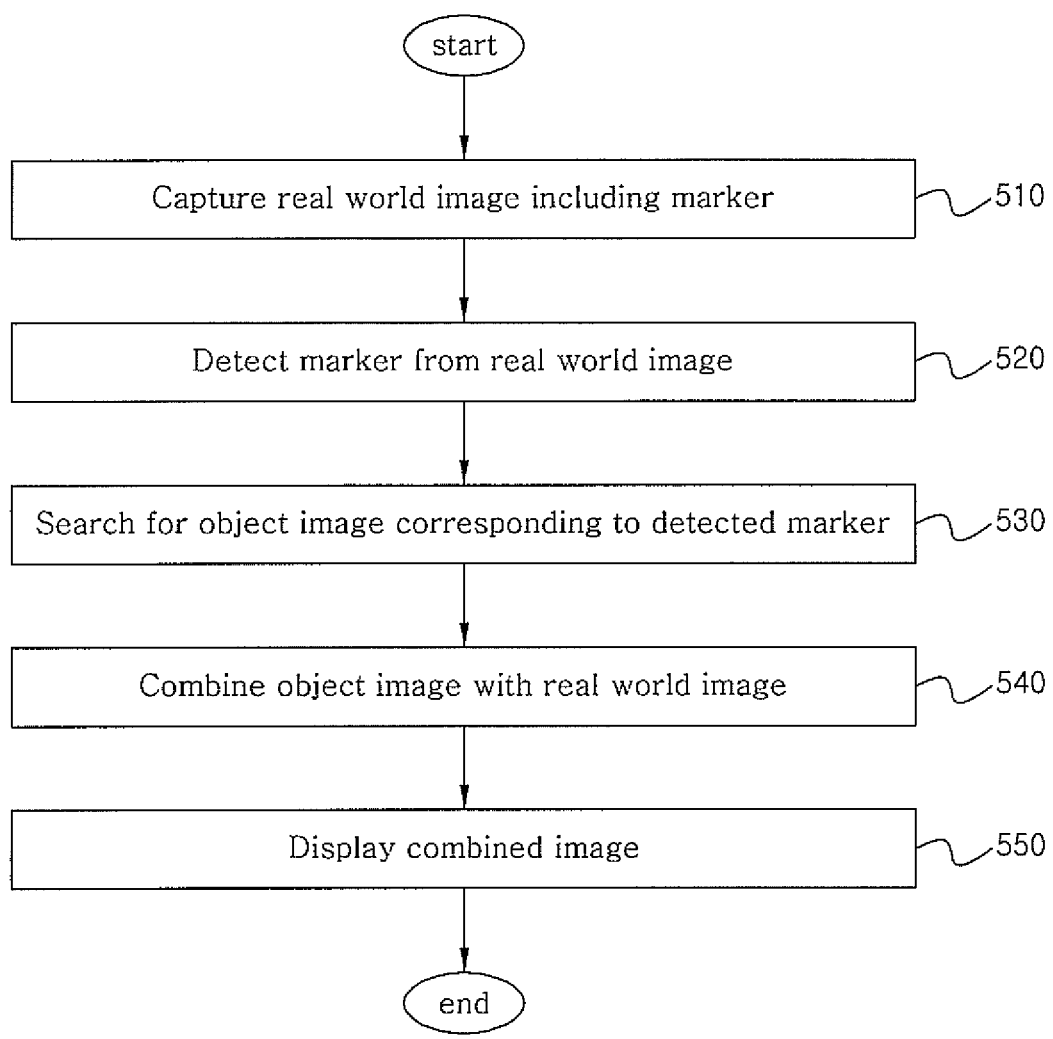
FIG. 5 is a flow chart showing an illustrative embodiment of a method for augmented reality.

FIG. 5 is a flow chart showing an illustrative embodiment of a method for augmented reality. The illustrative embodiment of the method can be performed by augmented reality apparatus 100.

Picture-taking unit 120 may capture a real world image including marker MK displayed on a displaying device (e.g., display device 200) (510). In one embodiment, marker MK may include a plurality of the marker images that are repeatedly displayed in sequence and at a predetermined time interval. Picture-taking unit 120 may send the real world image to processing unit 110.

Processing unit 110 may detect marker MK from real world images received from picture-taking unit 120 (520). In one embodiment, processing unit 110 may select some images from the real world images at predetermined frame rates, and detect marker images from the selected images by using the object recognition technology, such as edge matching, grayscale matching, and gradient matching, without limitations. Since processing unit 110 has information on the display interval of the marker images on the displaying device, processing unit 110 may determine the frames in consideration of the display interval. For example, when the displaying device displays the marker images in the display interval of 15 Hz and the number of frames per second that is captured by picture-taking unit 120 is 30 fps, processing device 110 may select one image among two real world images every two frames and detect the marker image from the selected image. The user may determine the interval of displaying marker images of the displaying device in consideration of the number of frames per second of picture-taking unit 120. In some embodiments, a user may determine the number of frames per second of picture-taking unit 120 in consideration of the interval of displaying marker images of the displaying device.

Processing unit 110 may interpret marker MK by using the combination of the marker images. Here, the "interpretation" of marker MK refers to interpreting the predetermined meaning of the marker images. By way of examples, marker MK having a sequence of numbers may be interpreted to indicate a bar code. By way of another example, marker MK having 28 English characters may be interpreted to indicate URL. In one embodiment, processing unit 110 may interpret marker MK by searching a storage or database that has stored marker information corresponding to the combination of the marker images, by receiving the marker information from an external server upon request, or by using the meanings of the marker images. Processing unit 110 may repeat block 520 at least twice for enhancing the accuracy of the marker recognition. That is, after a first set of marker images is detected, a second set of marker images may be detected and compared with the first set of marker images to determine whether the marker recognition is correct or not.

Processing unit 110 may search for an object image corresponding to the detected marker MK (530) from a storage or database storing the object images, or receive the object image from an external server upon request. Processing unit 110 may combine the object image with the real world image from picture-taking unit 120 (540) to generate a new image, i.e., an augmented reality image, and to display the augmented reality image on a display unit, which is included in apparatus 100 or is an external device (550). When combining the images, the object image may be disposed at a position of the real world image where marker MK is located. In the meantime, when marker MK includes marker images of three-dimensional figures, processing unit 110 may detect the orientation of the three-dimensional figure, and display the object in an orientation that is determined depending on the orientation of the three-dimensional figure.

Although FIG. 5 illustrates a flow of the method performed on apparatus 100, it is apparent to those skilled in the art that the method can be performed on apparatus 300. In this case, input unit 330 may receive input data from an external user input and transmit the input data into processing unit 310. Picture-taking unit 320 may capture a real world image including marker MK displayed on the displaying device and send the real world image to processing unit 310. Processing unit 310 may detect the marker images from the real world image according to the input data, interpret marker MK corresponding to the combination of the marker images, and combine the object image with the real world image. Storage unit 340 may store the marker information and/or the object images and transmit the marker information and/or the object images into processing unit 310. Display unit 350 may display the combined image.

Figure 6:
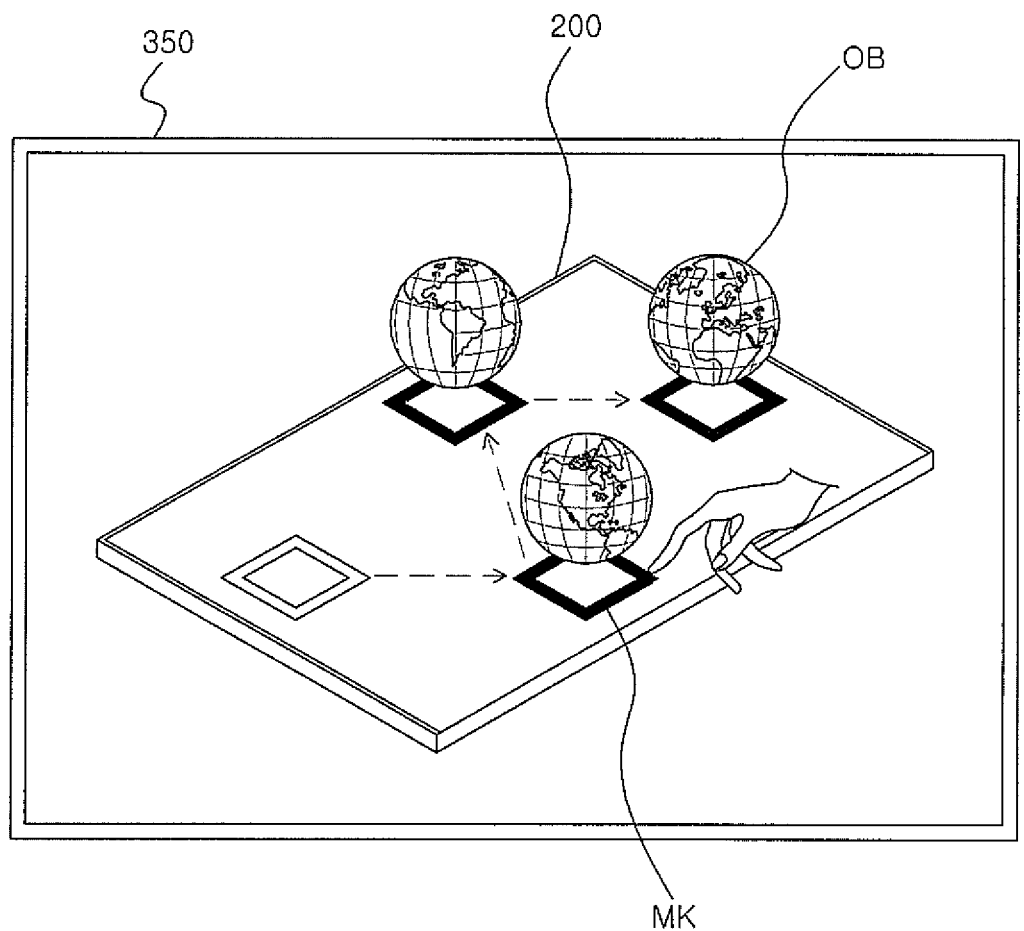
FIG. 6 is a schematic diagram showing an illustrative example of screen for augmented reality according to an illustrative embodiment.

FIG. 6 is a schematic diagram showing an illustrative example of screen for augmented reality. FIG. 6 illustrates that an augmented image is shown on display unit 350 of apparatus 300. The augmented image can be generated by overlaying a real world image including marker MK (e.g., an image of a displaying device (e.g., display device 200) in which marker MK is shown on the displaying device) on an object image (e.g., a global object OB). Globe object OB may be a graphic image and displayed at the position where marker MK is located. When a user moves marker MK on display device 200 along an arrow for example, by using a hand, a pen, or a mouse, globe object OB can also move therewith.

In one embodiment, an apparatus for augmented reality may further optionally include a displaying device, e.g., display device 200. By way of example, the apparatus may optionally include a displaying device configured to display the augmented reality created by apparatus 100 or 300. In another embodiment, a method for augmented reality may include displaying marker MK on the displaying device. By way of example, displaying of marker MK may be performed before capturing of the real world image (510) in the method of FIG. 5.

As described above, the illustrative embodiments of, an apparatus and method for augmented reality can provide a user with easy recognition of markers due to the simple shapes of the marker images and generate markers of large numbers such that they can serve as a new type marker in the field of augmented reality. Such apparatus and method can also be applied to various fields, such as design, game, education, search, and so on.

In one embodiment, the illustrative embodiment of a method for augmented reality may be applied to a storage medium. The storage medium can be read by a computer and include program instructions for executing the operations that may be implemented by various computers. The medium can record a program for performing the above-described method for augmented reality. The medium may include one of program instructions, data files, data structures and a combination thereof. Examples of the medium include magnetic media, such as hard disks, floppy disks, and magnetic tapes, optical media, such as CDs and DVDs, magnetic-optical media, such as Floptical Disks, and hardware devices, such as ROMs, RAMs, and flash memories, that are configured to store and execute program instructions. The medium may be a transmission medium, such as optical or metal lines, waveguides, etc., which include carriers containing signals for designating program instructions, data structures, etc. Examples of program instructions may include machine codes that may be made by compilers, as well as high-level language codes executed by a computer via an interpreter.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

Figure 7:
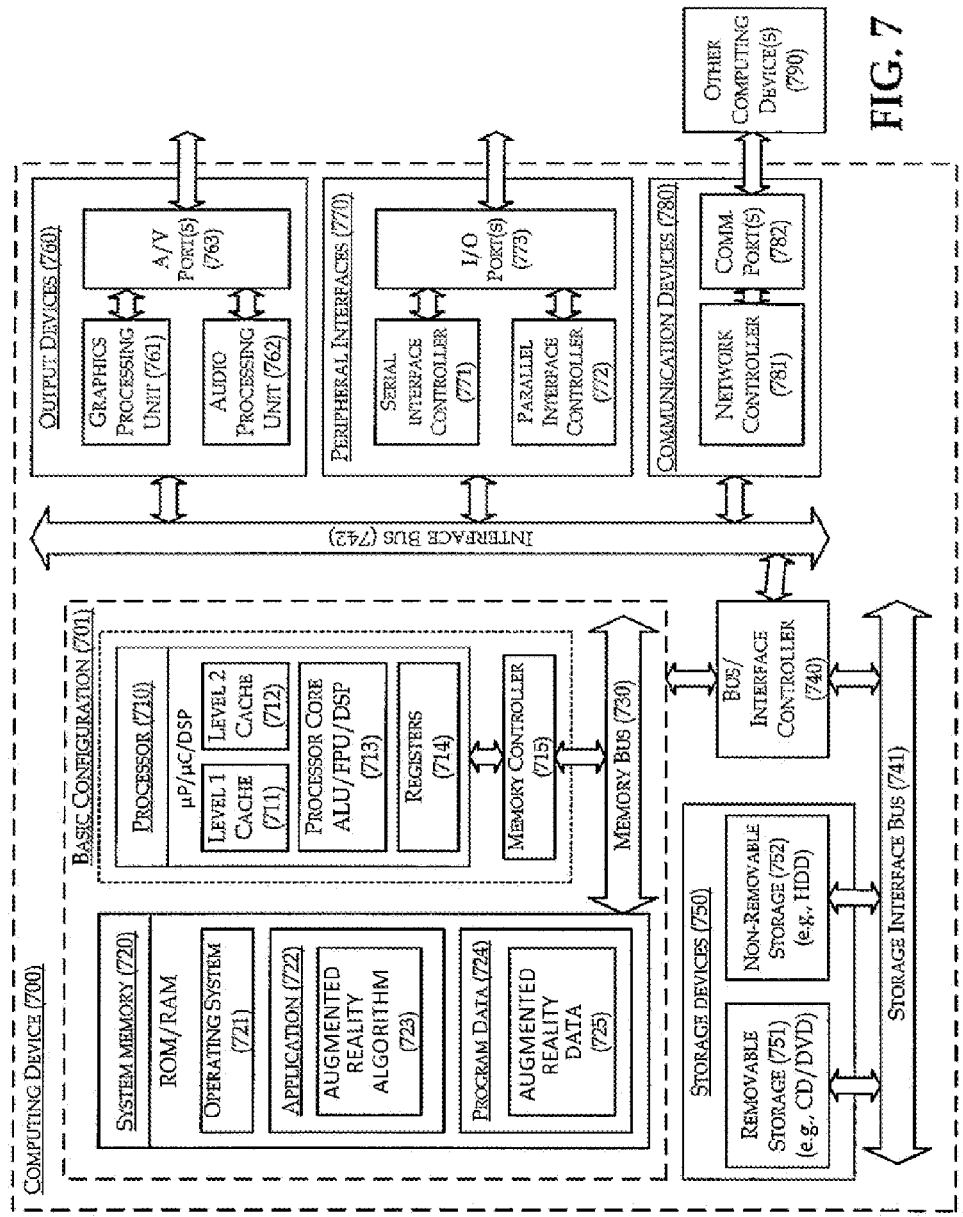
FIG. 7 is a block diagram illustrating an example computing device that is arranged for augmented reality in accordance with the present disclosure.

FIG. 7 is a block diagram illustrating an example computing device 700 that is arranged for augmented reality in accordance with the present disclosure. In a very basic configuration 701, computing device 700 typically includes one or more processors 710 and system memory 720. A memory bus 730 may be used for communicating between the processor 710 and the system memory 720.

Depending on the desired configuration, processor 710 may be of any type including but not limited to a microprocessor (µP), a microcontroller (µC), a digital signal processor (DSP), or any combination thereof. Processor 710 may include one more levels of caching, such as a level one cache 711 and a level two cache 712, a processor core 713, and registers 714. An example processor core 713 may include an arithmetic logic unit (ALU), a floating point unit (FPU), a digital signal processing core (DSP Core), or any combination thereof. An example memory controller 715 may also be used with the processor 710, or in some implementations the memory controller 715 may be an internal part of the processor 710.

Depending on the desired configuration, the system memory 720 may be of any type including but not limited to volatile memory (such as RAM), non-volatile memory (such as ROM, flash memory, etc.) or any combination thereof. System memory 720 may include an operating system 721, one or more applications 722, and program data 724. Application 722 may include an augmented reality algorithm 723 that is arranged to perform the functions as described herein including those described with respect to processes 510 to 550 of FIG. 5. Program Data 724 may include augmented reality data 725 that may be useful for operation with augmented reality algorithm 723 as will be further described below. In some embodiments, application 722 may be arranged to operate with program data 724 on an operating system 721 such that implementations of robust augmented reality may be provided as described herein. This described basic configuration is illustrated in FIG. 7 by those components within dashed line 701.

Computing device 700 may have additional features or functionality, and additional interfaces to facilitate communications between the basic configuration 701 and any required devices and interfaces. For example, a bus/interface controller 740 may be used to facilitate communications between the basic configuration 701 and one or more data storage devices 750 via a storage interface bus 741. The data storage devices 750 may be removable storage devices 751, non-removable storage devices 752, or a combination thereof. Examples of removable storage and non-removable storage devices include magnetic disk devices such as flexible disk drives and hard-disk drives (HDD), optical disc drives such as compact disc (CD) drives or digital versatile disc (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which may be used to store the desired information and which may be accessed by computing device 700. Any such computer storage media may be part of device 700.

Computing device 700 may also include an interface bus 742 for facilitating communication from various interface devices (e.g., output interfaces, peripheral interfaces, and communication interfaces) to the basic configuration 701 via the bus/interface controller 740. Example output devices 760 include a graphics processing unit 761 and an audio processing unit 762, which may be configured to communicate to various external devices such as a display or speakers via one or more A/V ports 763. Example peripheral interfaces 770 include a serial interface controller 771 or a parallel interface controller 772, which may be configured to communicate with external devices such as input devices (e.g., keyboard, mouse, pen, voice input device, touch input device, etc.) or other peripheral devices (e.g., printer, scanner, etc.) via one or more I/O ports 773. An example communication device 780 includes a network controller 781, which may be arranged to facilitate communications with one or more other computing devices 790 over a network communication link via one or more communication ports 782.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. An apparatus for augmented reality comprising:
a processing unit coupled to a picture-taking unit and a display unit, the processing unit configured to:
receive a real world image including a marker from the picture-taking unit, wherein the marker comprises a first marker image and a second marker image,
detect the first marker image from the real world image,
detect the second marker image from the real world image,
determine an object image that corresponds to a combination of the first marker image and the second marker image,
combine the object image with the real world image to generate an augmented reality image, and
cause the display unit to display the augmented reality image.

2. The apparatus of claim 1, wherein the first marker image and the second marker image each comprise three-dimensional images.

3. The apparatus of claim 1, wherein the processing unit is further configured to cause the display unit to display the first and second marker images in sequence at a predetermined time interval.

4. The apparatus of claim 3, wherein the processing unit is further configured to cause the display unit to display the first and second marker images at a display interval that is substantially equal to a quotient of a number of frames per second for the picture-taking unit to generate the real world image divided by a predetermined natural number.

5. The apparatus of claim 1, wherein the marker further comprises a third marker image not associated with the object image.

6. The apparatus of claim 1, wherein the marker further comprises at least one of a graphics interchange format (GIF) file, a flash file, or an animation file.

7. The apparatus of claim 1, wherein each of the first and second marker images has a predetermined meaning.

8. The apparatus of claim 1, wherein the processing unit is further configured to cause the display unit to display the first and second marker images.

9. The apparatus of claim 1, wherein the processing unit is further configured to cause a storage unit to store at least one of the object image or information associated with the marker.

10. The apparatus of claim 1, wherein the processing unit is further configured to receive input data from an external user input.

11. A computer-readable storage device comprising computer-executable instructions, the computer-executable instructions comprising:
  instructions for detecting a marker from a real world image, wherein the marker comprises a first marker image and a second marker image;
  instructions for determining an object image corresponding to a combination of the first marker image and the second marker image;
  instructions for combining the object image with the real world image to generate an augmented reality image; and
  instructions for displaying the augmented reality image.

12. The computer-readable storage device of claim 11, further comprising instructions for displaying the first and second marker images in sequence at a predetermined time interval.

13. The computer-readable storage device of claim 11, further comprising instructions for displaying the first and second marker images at a display interval that is equal to a quotient of the number of frames per second at which the real world image is captured divided by a predetermined natural number.

14. The computer-readable storage device of claim 11, wherein the marker further comprises a third marker image not associated with the object image.

15. A method for augmented reality, the method comprising:
  detecting a marker from a real world image, wherein the marker comprises a first marker image and a second marker image;
  determining an object image corresponding to a combination of the first marker image and the second marker image;
  combining the object image with the real world image to generate an augmented reality image; and
  displaying the augmented reality image.

16. The method of claim 15, further comprising generating the augmented reality image comprising the marker.

17. The method of claim 15, further comprising displaying the first and second marker images in sequence at a predetermined time interval before detecting the marker from the real world image.

18. The method of claim 15, further comprising displaying the first and second marker images at a predetermined display interval, wherein the predetermined display interval is equal to a quotient of the number of frames per second for generating the real world image divided by a predetermined natural number.

19. The method of claim 15, wherein the marker further comprises a third marker image not associated with the object image.

20. The method of claim 15, wherein the first and second marker images comprise three-dimensional images.

* * * * *